United States Patent [19]

Ishida et al.

[11] Patent Number: 5,296,251

[45] Date of Patent: Mar. 22, 1994

[54] LIQUOR CAPABLE OF BEING FROZEN WHEN POURED

[75] Inventors: Shizuhiko Ishida, 52-9, Shichiku Higashikurisu-cho, Kita-ku, Kyoto-shi, Kyoto-fu, 603; Shunichi Karita, Tsu; Yasuo Umehara; Masaaki Hamachi, both of Kobe; Yataro Nunokawa, Ashiya, all of Japan

[73] Assignees: Ozeki Corporation, Hyogo; Shizuhiko Ishida, Kyoto, both of Japan

[21] Appl. No.: 812,278

[22] Filed: Dec. 23, 1991

[30] Foreign Application Priority Data

Dec. 26, 1990 [JP] Japan .................. 2-414839

[51] Int. Cl.$^5$ .................................................. C12G 3/06
[52] U.S. Cl. ..................................... 426/592; 426/524
[58] Field of Search ........................ 426/590, 592, 524

[56] References Cited

U.S. PATENT DOCUMENTS

| | | | |
|---|---|---|---|
| 3,647,472 | 3/1972 | Speech | 426/592 |
| 3,897,571 | 7/1975 | Homler | 426/592 |
| 3,939,667 | 2/1976 | Halverson . | |
| 3,987,211 | 10/1976 | Dunn | 426/590 |
| 4,235,936 | 11/1980 | Kahn | 426/590 |
| 4,790,999 | 12/1988 | Ashmont | 426/592 |
| 4,808,428 | 2/1989 | Forsstrom | 426/592 |

FOREIGN PATENT DOCUMENTS

| | | |
|---|---|---|
| 0268097A1 | 5/1988 | European Pat. Off. . |
| 2478955 | 10/1981 | France ............... 426/590 |
| 60-37972 | 2/1985 | Japan ................. 426/524 |
| 60-137275 | 7/1985 | Japan ................. 426/590 |
| 2-23859 | 1/1990 | Japan ................. 426/524 |
| 2-31663 | 2/1990 | Japan ................. 426/590 |
| 2-171570 | 7/1990 | Japan ................. 426/524 |
| 1331518 | 9/1973 | United Kingdom . |

*Primary Examiner*—Carolyn Paden
*Attorney, Agent, or Firm*—Birch, Stewart, Kolasch & Birch

[57] ABSTRACT

A new type of liquors are provided which can be appreciated as liquors having a unique feature that they are frozen into a sherbet-like form in a moment when poured into a glass or the like, at the time of drinking. The liquors of the present invention cannot be frozen until they are poured into a glass because they are maintained in the supercooled state below the freezing point in a bottle or the like which is kept under a pressure of not more than 0.9 kg/cm$^2$ or 1.5 to 5 kg/cm$^2$, as measured under the condition that atmospheric pressure is defined to be 1 kg/cm$^2$.

4 Claims, 2 Drawing Sheets

LIQUOR CAPABLE OF BEING FROZEN WHEN POURED

FIELD OF THE INVENTION

The present invention relates to a new type of liquor having the unique feature of being maintained in the supercooled state without freezing in a vessel such as a bottle or the like, so that it can be frozen into a sherbet-like form in the moment when it is poured from the vessel into a glass or the like, at the time of drinking.

BACKGROUND OF THE INVENTION

It is well known to freeze a liquor, such as Japanese "sake" (refined sake), in a vessel and serve the liquor for drinking in its frozen state. Such a liquor is widely referred to as a "frozen liquor". In order to obtain a homogeneously-frozen liquor, the liquor in the liquid state should be rapidly frozen because it has some alcoholic content and various essences are contained therein.

In general, the freezing temperature in a freezer for ordinary business use or in a home freezer is about $-20°$ C. At this temperature, for example, Japanese "sake" can be frozen but cannot be brought into the homogeneously-frozen state because the cooling performance of the freezer is insufficient for this purpose. Therefore, in order to bring a homogeneously "frozen liquor" on the market, it is necessary to convey the liquor in the frozen state after rapid freezing, which causes a considerable increase in the cost.

Moreover, in cases where a liquor has already been frozen in a vessel, much labor is required at the time of drinking to transfer the frozen liquor into a glass by means of a spoon or the like. In particular, if the frozen liquor, is hard, it requires a great deal of labor and time in order to wait until the frozen liquor softens to such a degree that it becomes suitable for drinking.

OBJECTS OF THE INVENTION

Under these circumstances, in order to solve the above-described problem, the present inventors have carried out intensive studies to find a new type of liquor. As a result, it has been found that a liquor having the unique feature as described above, i.e., a liquor capable of being frozen at the moment when it is poured from a vessel into a glass or the like, can be obtained by maintaining the liquor in the liquid state below the freezing point without freezing, i.e., by maintaining the liquor in the supercooled state. In addition, it has also been found that the liquor poured into a glass is in a softly-frozen state suitable for drinking.

Thus, the main object of the present invention is to provide a new type of liquor which can be recognized as liquors having the unique feature of being maintained in the supercooled state without freezing before drinking, but liquors that can be turned into a homogeneously-frozen sherbet-like form suitable for drinking, when poured from a vessel into a glass or the like.

This object as well as other objects and advantages of the present invention will become apparent to those skilled in the art from the following description with reference to the accompanying drawings.

SUMMARY OF THE INVENTION

According to the present invention, there is provided a liquor capable of being frozen when poured from a vessel for storage into a vessel for drinking, which is maintained in the supercooled state by keeping it below the freezing point without freezing in the vessel for storage which is kept under a pressure of not more than 0.9 kg/cm$^2$ or 1.5 to 5 kg/cm$^2$, as measured under the condition that atmospheric pressure is defined to be 1 kg/cm$^2$.

DETAILED DESCRIPTION OF THE INVENTION

The present invention is based on the novel finding that any liquor can be readily brought into the supercooled state by keeping it in a vessel for storage such as a bottle or the like under pressure or reduced pressure at a temperature which is below the freezing point but above a temperature at which the liquor starts to freeze (starting temperature of freezing), e.g., usually at a temperature of $-10°$ to $-20°$ C. In other words, the starting temperature of freezing can be decreased, as compared with that obtained under atmospheric pressure, by filling the liquor in a hermetically-sealed vessel for storage, which is made of a material such as glass, polyethylene terephthalate (PET), paper, aluminum, or the like, under pressure or reduced pressure according to a conventional technique. Such a decrease in the starting temperature of freezing makes it possible to store the liquor in a freezer as it is in the liquid state without freezing. When bringing the liquor into the supercooled state, it is preferable to employ a lower rate of cooling, e.g., 1° to 5° C./hour, because a more stable supercooled state can be obtained.

The liquor in the supercooled state can be frozen in the moment when poured from the vessel for storage into a vessel for drinking, e.g., a glass which has been cooled in readiness or a glass at room temperature, thereby obtaining a homogenously-frozen sherbet-like liquor suitable for drinking with ease. The liquor of the present invention can be conveyed with a refrigerator to bring it on the market, and there is no need to utilize a freezer for conveyance as in the case of a conventional "frozen liquor", thereby reducing the cost.

The liquor per se used in the present invention is not specifically limited and can be those which are well known in the art and produced by an ordinary process, such as Japanese "sake", wine, liqueur, and the like.

PREFERRED EMBODIMENTS OF THE INVENTION

The following Examples further illustrate the present invention in detail but are not to be construed to limit the scope thereof.

EXAMPLE 1

Japanese sake (alcoholic content: 14.3%) was heated to an appropriate temperature and filled in a glass vessel for storage (volume: 180 ml) while it was kept under reduced pressure. The pressure in the vessel at this time was 0.74 kg/cm$^2$. The vessel containing the "sake" was cooled in a home freezer.

Figure 1:
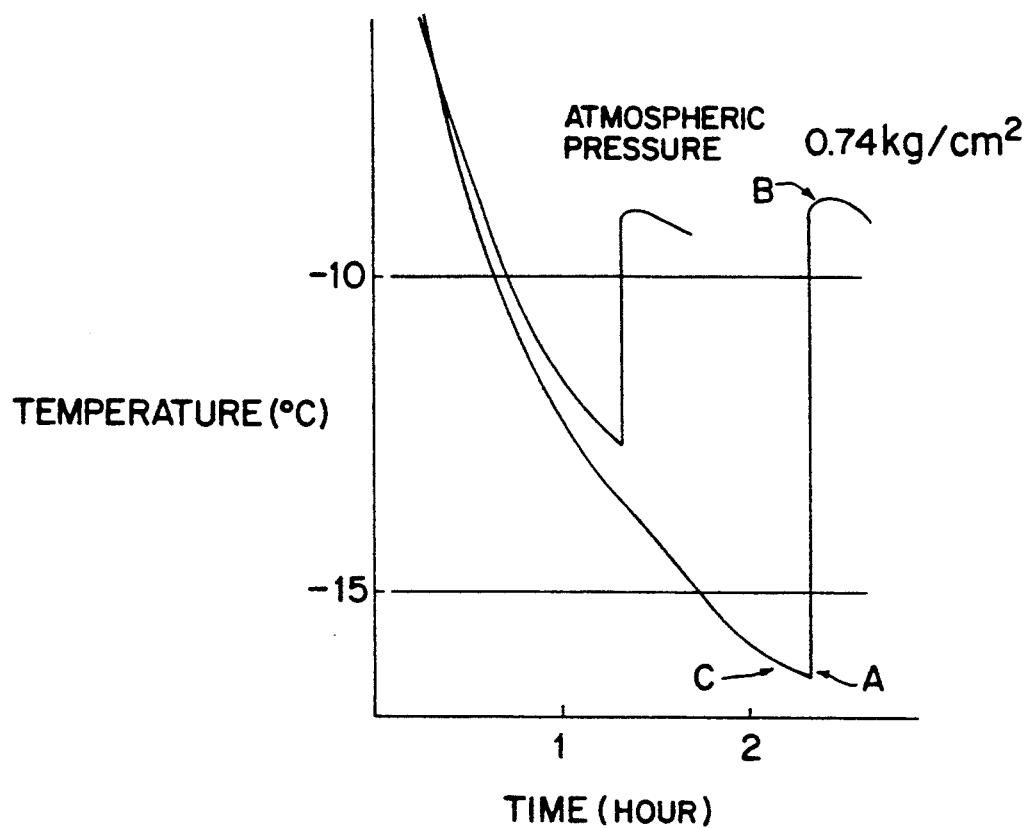
FIG. 1 is a diagram showing the cooling curve in the preparation under reduced pressure of the liquor of Example 1 hereinafter, as well as the cooling curve in a comparative experiment under atmospheric pressure.

The cooling curve obtained at this time is shown in FIG. 1.

As shown in FIG. 1, the "sake" contained in the vessel is present in the liquid state until the temperature reached point A in the curve. At the temperature corresponding to point A, the "sake" starts to freeze, and the primary freezing is completed at the temperature corresponding to point B in the curve. That is, the temperature at point A is defined as the starting temperature of freezing. At the temperature corresponding to point C near point A in the curve, the vessel containing the "sake" is taken out from the freezer to serve for drinking.

When the "sake" thus supercooled was poured into a glass which had been cooled in readiness, the poured "sake" was frozen in the glass, resulting in a sherbet-like "sake".

As a comparative experiment, the above "sake" was cooled in the same manner as described above, except that the "sake" was filled in a glass vessel for storage under atmospheric pressure, i.e., under a pressure of 1 kg/cm$^2$. In this case, the temperature at point A was higher than that obtained under reduced pressure, as shown in FIG. 1, and the "sake" thus supercooled was not frozen even when poured into a glass.

EXAMPLE 2

Japanese "sake" (alcoholic content: 15.8%) was filled in an aluminum vessel for storage (volume: 180 ml) under pressure by air. The pressure in the vessel at this time was 3 kg/cm$^2$. The vessel containing the "sake" was stored in a freezer at about −20° C.

Figure 2:
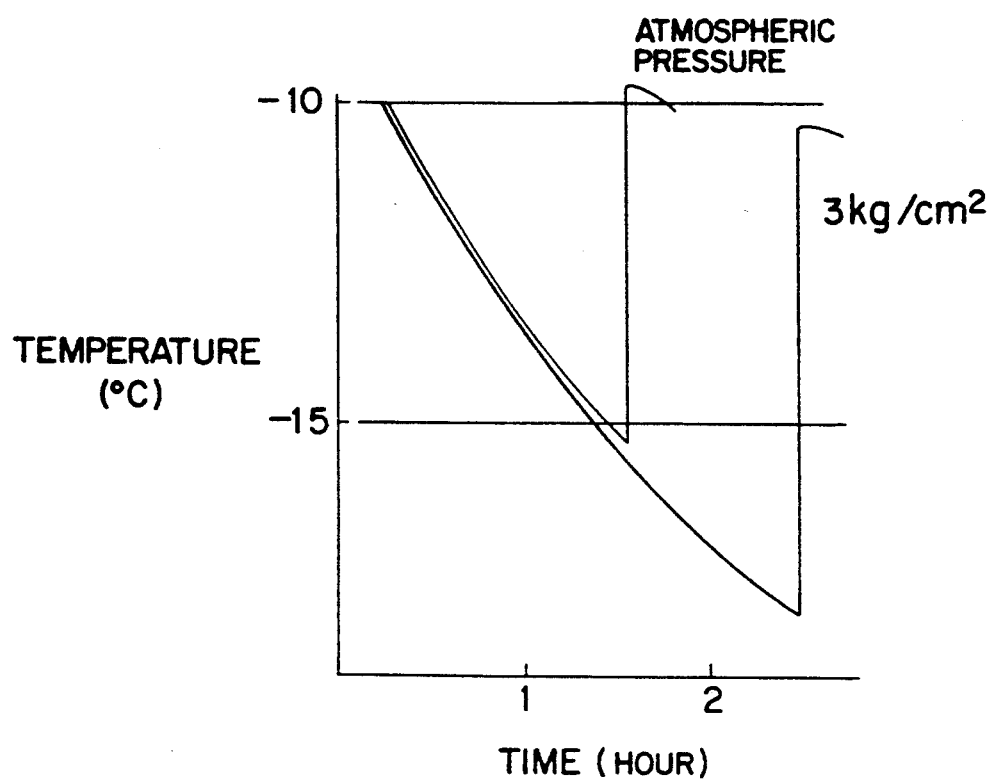
FIG. 2 is a diagram showing the cooling curve in the preparation under pressure of the liquor of Example 2 hereinafter, as well as the cooling curve in a comparative experiment under atmospheric pressure.

The cooling curve obtained at this time is shown in FIG. 2. The cooling step is performed in the same manner as in Example 1.

When the "sake" thus supercooled was poured into a glass at room temperature, the poured sake was frozen in the glass, resulting in a sherbet-like refined sake. As a comparative experiment, the above "sake" was cooled in the same manner as described above, except that the "sake" was filled in an aluminum vessel for storage under atmospheric pressure, i.e., under a pressure of 1 kg/cm$^2$. In this case, the temperature at point A was also higher than that obtained under reduced pressure, as shown in FIG. 2, and the "sake" thus supercooled was not frozen even when poured into a glass.

EXAMPLE 3

White wine (alcoholic content: 11.8%) was filled in a paper-packing vessel for storage (volume: 180 ml) under reduced pressure (0.85 kg/cm$^2$). The vessel containing the white wine was cooled to −10° C.

Figure 3:
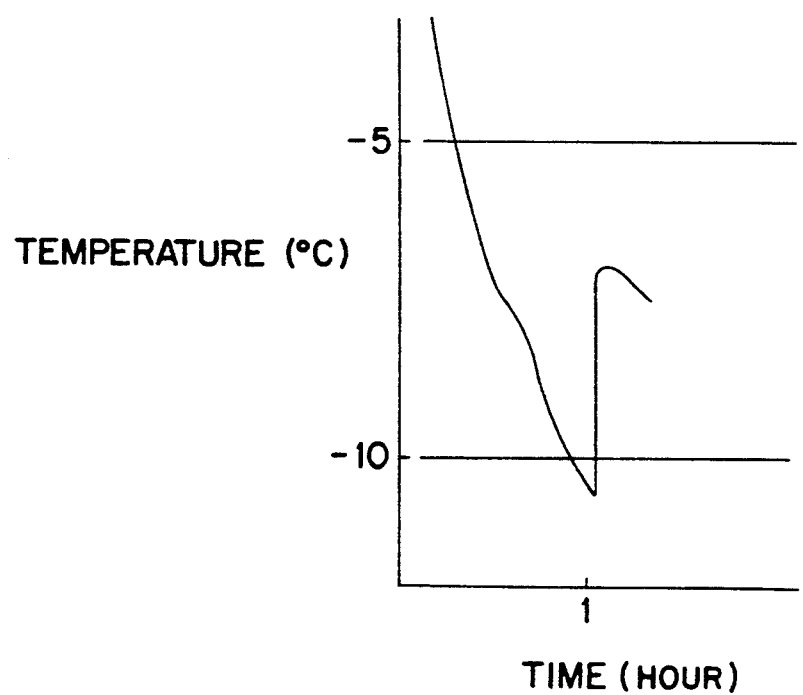
FIG. 3 is a diagram showing the cooling curve in the preparation under reduced pressure of the liquor of Example 3 hereinafter.

The cooling curve obtained at this time is shown in FIG. 3.

After confirming that the cooled wine was still in the liquid state, the paper-packing vessel was made open and the white wine thus supercooled was poured into a glass which had been cooled in readiness. The poured wine was frozen in the glass, resulting in a sherbet-like white wine.

What is claimed is:

1. A process for preparing a liquor capable of being frozen when poured comprising the steps of:
   filling a liquor in a vessel under a pressure of not more than 0.9 kg/cm$^2$ or 1.5 to 5 kg/cm$^2$, as measured under the condition that atmospheric pressure is defined to be 1 kg/cm$^2$;
   cooling the vessel containing the liquor to a temperature between the freezing point and the starting temperature of freezing at which the liquor starts to freeze; and
   maintaining the liquor in the supercooled liquid state so that the liquor becomes softly frozen when poured; said liquor being selected from the group consisting of Japanese "sake, " wine and liqueur.

2. A process according to claim 1, wherein the liquor is kept at a temperature in the range of −10° to −20° C.

3. A process according to claim 1, wherein the cooling step is performed at a rate of 1° to 5° C./hour.

4. A process for preparing a liquor capable of being frozen when poured comprising the steps of:
   filling a liquor in a vessel under a pressure of not more than 0.9 kg/cm$^2$ or 1.5 to 5 kg/cm$^2$, as measured under the condition that atmospheric pressure is defined to be 1 kg/cm$^2$;
   cooling the vessel containing the liquor to a temperature between the freezing point and the starting temperature of freezing at which the liquor starts to freeze; and
   maintaining the liquor in the supercooled liquid state so that the liquor becomes softly frozen when poured.

* * * * *

UNITED STATES PATENT AND TRADEMARK OFFICE
CERTIFICATE OF CORRECTION

PATENT NO. : 5,296,251

DATED : March 22, 1994

INVENTOR(S) : Ishida et al.

It is certified that error appears in the above-identified patent and that said Letters Patent is hereby corrected as shown below:

On the title page: Item

"[75] Inventors:" please correct the spelling of the second inventor's name from "Shunichi Karita" to --Shuichi Karita--.

Signed and Sealed this

Sixth Day of September, 1994

*Attest:*

BRUCE LEHMAN

*Attesting Officer*  *Commissioner of Patents and Trademarks*